INVENTOR.
HENRY T. WILTON

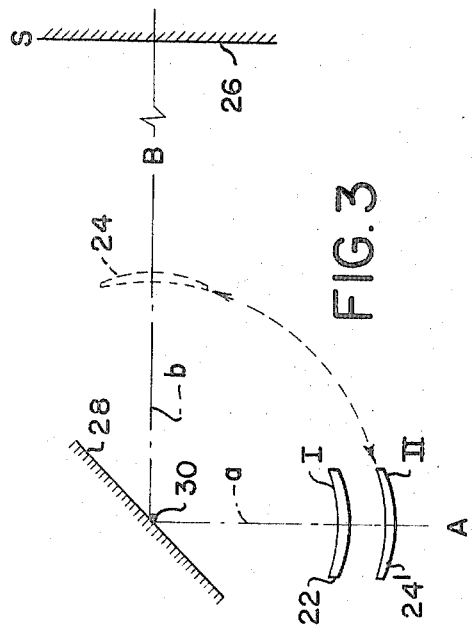
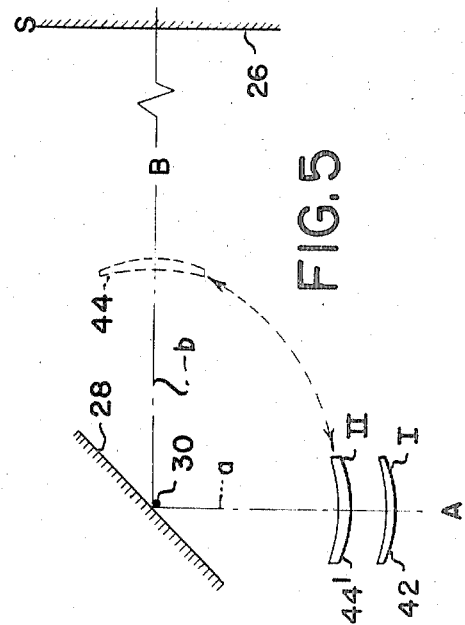
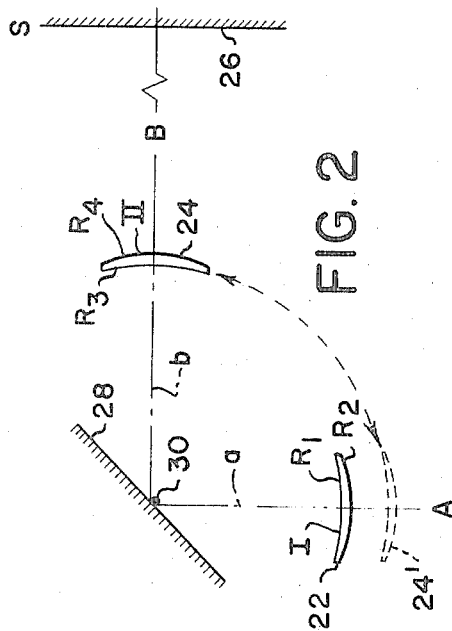
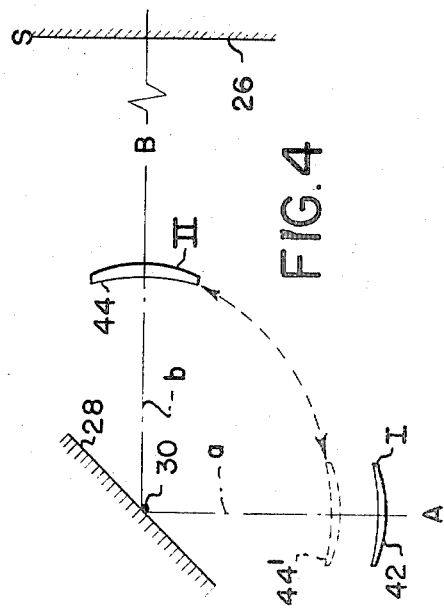

July 11, 1972  H. T. WILTON  3,675,998
DUAL MAGNIFICATION PROJECTION LENS
Filed Oct. 29, 1970  3 Sheets-Sheet 3
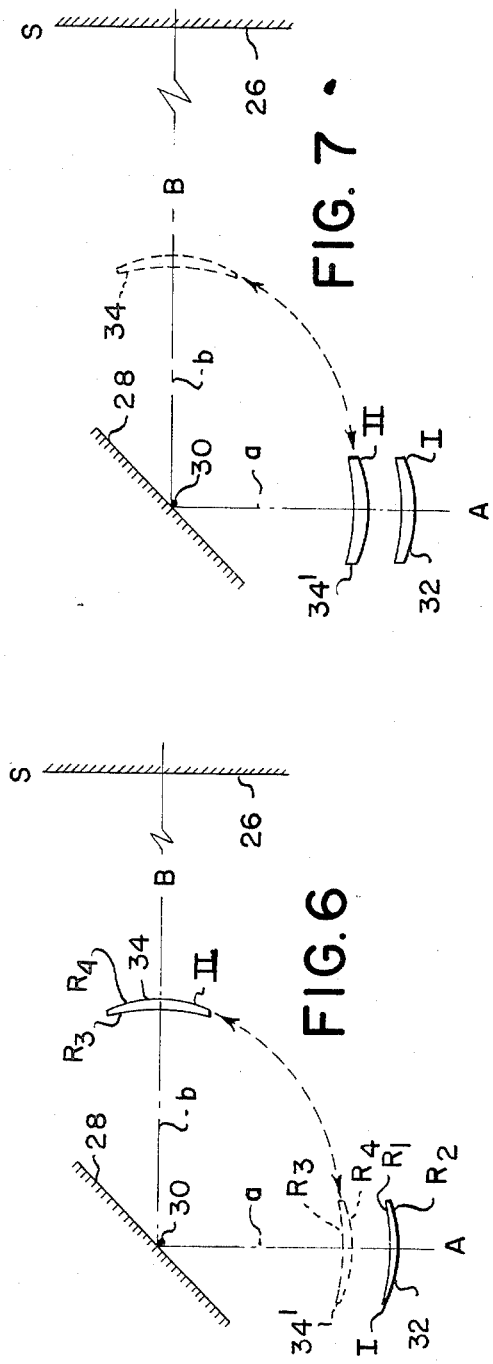
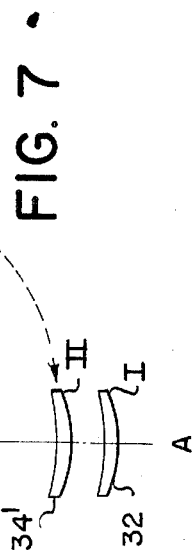
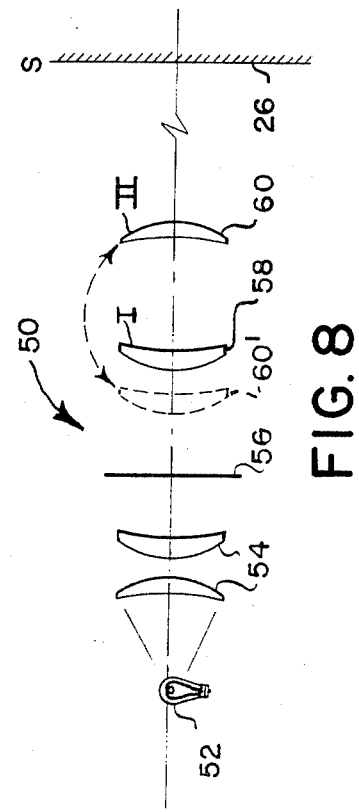
INVENTOR.
HENRY T. WILTON
BY
ATTORNEY United States Patent Office 3,675,998
Patented July 11, 1972

3,675,998
DUAL MAGNIFICATION PROJECTION LENS
Henry T. Wilton, Buffalo, N.Y., assignor to American Optical Corporation, Southbridge, Mass.
Filed Oct. 29, 1970, Ser. No. 85,104
Int. Cl. G02b 15/00, 27/18
U.S. Cl. 353—101
4 Claims

ABSTRACT OF THE DISCLOSURE

A two-element projection lens in which one element is swingably mounted on an axis perpendicular to the optical path. When the two lens elements are positioned adjacent each other, they comprise a lens having a given focal length to effect a certain magnification. When the two lens elements are separated by swinging one to an alternate position in the optical path, the combined lens has a different focal length to effect a different magnification.

BACKGROUND OF THE INVENTION

The present invention is related to projectors in general and more specifically to overhead projectors of the type wherein an object or transparency is placed over a light source, the transmitted light passing through an overhead projection lens and onto a projection screen. Typically, these projectors provide only one size of image at a given distance from a screen.

By means of the present invention, a combination or two-element projection lens is provided by which two magnifications can be selected at any given distance from the projection screen. This makes it possible to demonstrate objects or transparencies at selected magnifications as desired for various reasons, including size of the audience, detail to be viewed, etc.

Accordingly, it is an object of this invention to provide an overhead projector with a projection lens capable of dual magnification.

Another object is to provide a dual magnification projection lens which is parfocal at its two magnifications.

Another object is to provide such a projection lens with standardized or identical lens elements.

Other objects, advantages and features of this invention may become apparent from the following description of various embodiments thereof, when taken in connection with the accompanying drawings.

DRAWINGS

FIGS. 2 and 3 are optical diagrams showing the alternate positions of the lens elements in the projection head;

FIGS. 4 and 5 are optical diagrams showing the alternate positions of the lens elements in the projector head in an alternate embodiment of this invention;

FIGS. 6 and 7 are optical diagrams showing the alternate positions of the lens elements in the projector head in an alternate embodiment of this invention; and FIG. 8 is an optical diagram of a linear projector employing the concept of this invention.

DESCRIPTION

Figure 1:
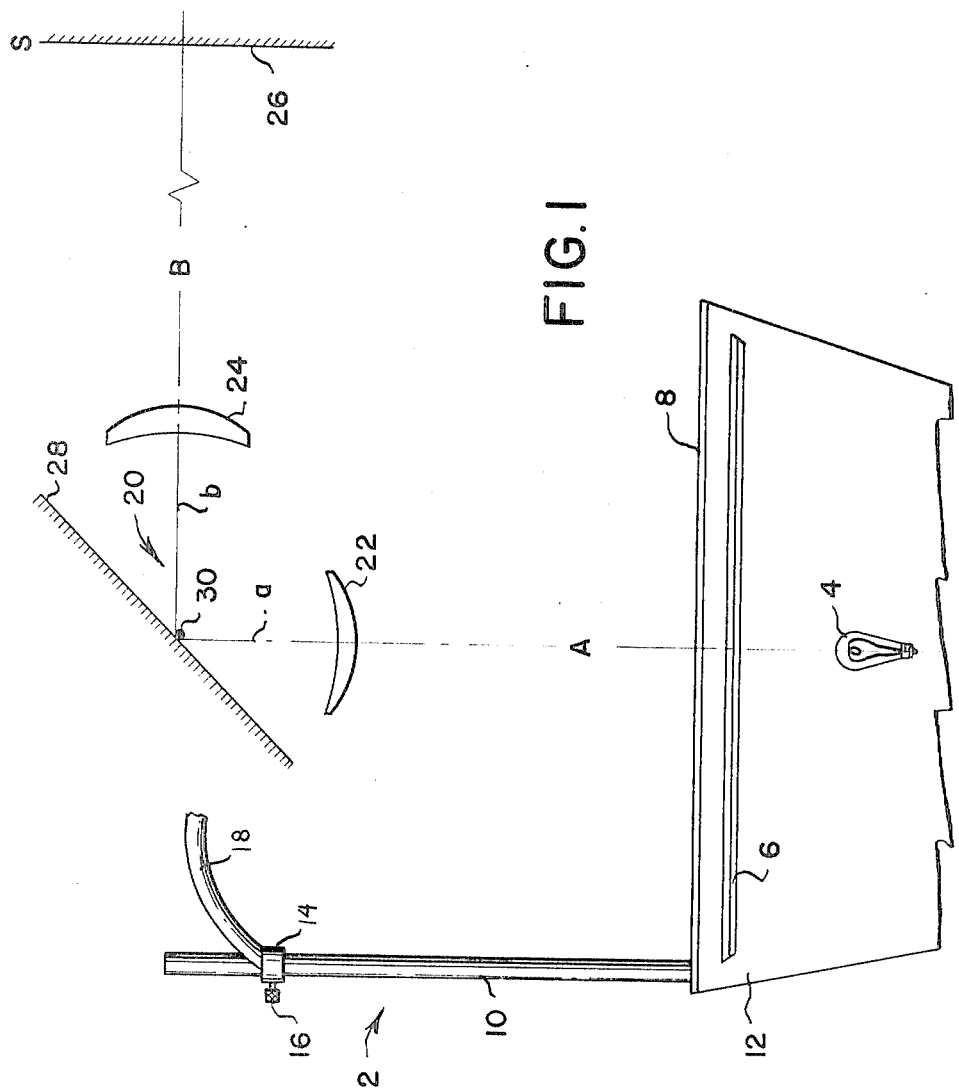
FIG. 1 is a side elevation view, somewhat schematic, of a projector apparatus of which the present invention is a part.

In FIG. 1, an overhead projector is generally and schematically represented at 2 and includes a light source 4, a Fresnel lens 6, and an apertured object surface 8. A post 10 is supported on a frame 12 which also supports the lens 6 and surface 8. A clamping bracket 14 is mounted on post 10 and is vertically adjustable therealong by means of a clamping knob 16. An arm 18 is fixed to bracket 14, and to this arm 18 is connected the projector head assembly 20. Projector head assembly 20 includes a pair of projection lens or objective lens elements 22, 24. A mirror 28 forms a part of projector head assembly 20 and is mounted at an angle of approximately 45 degrees to reflect light from the vertical axis A to the horizontal axis B and to a screen 26. Mirror 28 is tiltable to project images at angles above or below the horizontal positions if desired.

As is known in the art, when a transparency or object on surface 8 is illuminated, its image is projected on a screen 26 at plane S. That is, surface 8 and screen 26 are in conjugate relationship relative to objective lenses 22, 24.

Referring now to FIGS. 2 and 3, lens elements 22 and 24 and mirror 28 are shown alone for the sake of simplicity. In this embodiment, lens element 22 (also designated I) is stationary and lens element 24 (also designated II) is mounted to swing about an axis or point 30 into the alternate positions on the optical axes A or B. Lens 24, the movable lens, is the outward component of lenses 22, 24. It will be apparent that the compound lenses 22, 24 shown in FIG. 2 are different lenses from the compound lenses 24', 22 shown in FIG. 3. The lenses 22, 24 of FIG. 2 will have a given focal length and will effect a certain magnification of the image on screen 26. By comparison, the lenses 24', 22 of FIG. 3 will have a somewhat shorter focal length and will effect a greater magnification of the image on screen 26.

The geometry of objective lenses 22, 24 is indicated in the following chart for the FIG. 2–FIG. 3 modification, designated 100. Lens surface radii are designated $R_1$–$R_4$. Optical axis A is the dimension between surface 8 and pivot 30. Optical axis B is the dimension between pivot 30 and screen 26. The distance along axis A between pivot 30 and lens I is designated $a$. The distance along axis B (or A) between pivot 30 and lens II is designated $b$. The following tabulation represents one specific embodiment according to the present invention and shown in FIGS. 2 and 3. As will be apparent, lens elements 22 and 24 are identical. Dimensions are in millimeters unless otherwise indicated.

FIGURES 2 AND 3

| | $R_1$ | $R_2$ | $R_3$ | $R_4$ | $a$ | $b$ | Axis B | Δ axis A (Fig. 2–Fig. 3) | Magnification, Fig. 3/Fig. 2 |
|---|---|---|---|---|---|---|---|---|---|
| Modification 100 | 153.4 | 106.0 | 153.4 | 106.0 | 60 | 76 | 7'0" | 1⅛" | 153.8/100 area. 124.0/100 linear. |

Referring now to FIGS. 4 and 5, modifications of this invention are shown in which lens elements 42 and 44, and mirror 28 comprise the projector objective. In these modifications, lens element 44 (also designated II) is the inward component and swings about pivot 30 from a first position on the B axis to a second position on the A axis. Lens element 42 (also designated I) is stationary.

The geometry of objective lenses 42, 44 is indicated in the following chart. Again, in each of these modifications, (200, 300, 400) lens elements 42 and 44 are identical.

Vertical movement of head assembly 20 for focus at alternate positions is smaller than in modification 100, and in modification 400 is zero—that is the system is parfocal.

FIGURES 4 AND 5

| | $R_1$ | $R_2$ | $R_3$ | $R_4$ | $a$ | $b$ | Axis B | A axis A (Fig. 4- Fig. 5) | Magnification, Fig. 5/Fig. 4 |
|---|---|---|---|---|---|---|---|---|---|
| Modification: | | | | | | | | | |
| 200 | 153.4 | 106.0 | 153.4 | 106.0 | 82.6 | 55.0 | 7'0" | 13/16" | 147.7/100 area. 121.5/100 linear. |
| 300 | 138.0 | 95.2 | 138.0 | 95.2 | 82.6 | 55.0 | 7'0" | 1⅛" | 155.0/100 area. 124.5/100 linear. |
| 400 | 138.0 | 95.2 | 138.0 | 95.2 | 82.6 | 55.0 | 43" | 0 | 178.9/100 area. 133/100 linear. |

Referring now to FIGS. 6 and 7, another modification (500) of this invention is shown in which lens elements 32 and 34, and mirror 28 comprise the projector objective. In this modification, lens element 34 is the inward component and swings about pivot 30 from a first position on the B axis to a second position on the A axis. Unlike modifications 200, 300 and 400 of FIGS. 4 and 5, lens elements 32, 34 are not identical. However, this system is also capable of being parfocalized in its two alternate positions. An example or specific embodiment of this arrangement is given by the data on the following chart. As will be apparent, axis A remains constant (parfocalized system) in the alternate positions of lens element II.

FIGURES 6 AND 7

| | $R_1$ | $R_2$ | $R_3$ | $R_4$ | $a$ | $b$ | Axis B | A axis A (Fig. 6- Fig. 7) | Magnification, Fig. 7/Fig. 6 |
|---|---|---|---|---|---|---|---|---|---|
| Modification | | | | | | | | | |
| 500 | 186.2 | 106.0 | 167.1 | 130.7 | 82.6 | 55.0 | 7'0" | 0 | 132.5/100 area. 115.1/100 linear |

The foregoing embodiments of this invention illustrate its primary intended use, that is, in connection with overhead projectors. Of these, modifications 300, 400 of FIGS. 4, 5 are presently preferred. However, the invention is not so limited. Referring now to FIG. 8, a straight-line projector 50 is represented and includes a light source 52, condenser 54, object or transparency 56, objective lenses 58, 60, and screen 26. As in the folded optical systems of the above-described overhead projectors, this straight-line system includes an objective 58, 60 in which one lens element, such as 60, is mounted on a suitable mechanism so as to be alternately positionable at the two positions 60 and 60' shown in FIG. 8. This objective operates similarly to those described in the folded optical systems to provide a given magnification in its solid line position, and a second larger magnification when shifted to its phantom line position. The objective 58, 60 may or may not require refocusing relative to object 56 depending on whether the two alternate lens positions are parfocalized.

In all the embodiments of this invention shown herein, lens elements designated I are stationary and those designated II are shiftable.

In the use of such an arrangement as described in any of the foregoing modifications, a projector can provide dual magnification of an image upon a projection screen without the necessity of moving the projector relative to the screen.

It may occur to others of ordinary skill in the art to make modifications of this invention which will remain within its concept and scope and not constitute a departure. Accordingly, it is intended that the invention be not limited by any details of its description but only by the following claims.

What is claimed is:

1. An overhead projector having a light source, a condenser, an object aperture and an objective lens assembly disposed along a folded optical path, said objective lens assembly including a pair of objective lens elements and a mirror mounted on an objective head, said apparatus characterized by the improvement wherein:

one of said objective lens elements is pivotally mounted relative to said head to swing from one to the other of alternate positions in said optical path and relative to the other of said objective lens elements, the radii of said lenses ($R_1$–$R_4$) and their axial spacings ($a$, $b$) from the pivot axis of the objective head being substantially as follows, expressed in millimeters, wherein positive numbers indicate measurements made from the direction of said pivot axis:

| Element I | | Element II | | | |
|---|---|---|---|---|---|
| $R_1$ | $R_2$ | $R_3$ | $R_4$ | $a$ | $b$ |
| 153.4 | 106.0 | 153.4 | 106.0 | 60 | 76 |

2. An overhead projector as defined in claim 1 in which said lens element II is pivotally mounted relative to said head.

3. An overhead projector having a light source, a condenser, an object aperture and an objective lens assembly disposed along a folded optical path, said objective lens assembly including a pair of objective lens elements and a mirror mounted on an objective head, said apparatus characterized by the improvement wherein:

one of said objective lens elements is pivotally mounted relative to said head to swing from one to the other of alternate positions in said optical path and relative to the other of said objective lens elements, the radii of said lenses ($R_1$–$R_4$) and their axial spacings ($a$, $b$) from the pivot axis of the objective head being substantially as follows, expressed in millimeters, wherein positive numbers indicate measurements made from the direction of said pivot axis:

| Element I | | Element II | | | |
|---|---|---|---|---|---|
| $R_1$ | $R_2$ | $R_3$ | $R_4$ | $a$ | $b$ |
| 138.0 | 95.2 | 138.0 | 95.2 | 82.6 | 55 |

4. An overhead projector as defined in claim 3 in which said lens element II is pivotally mounted relative to said head.

References Cited

UNITED STATES PATENTS

| 3,486,817 | 12/1969 | Hubner | 353—66 X |
| 3,558,225 | 1/1971 | Kirchhoff | 355—57 X |
| 2,168,487 | 8/1939 | Mestre | 353—66 |

FOREIGN PATENTS

| 860,192 | 9/1940 | France | 350—39 |
| 705,919 | 5/1941 | Germany | 350—42 |

JOHN K. CORBIN, Primary Examiner

U.S. Cl. X.R.

350—183, 202, 231